(12) United States Patent
Hoskins et al.

(10) Patent No.: US 9,446,310 B2
(45) Date of Patent: Sep. 20, 2016

(54) SUGGESTING FRIENDS FOR PLAYING A GAME

(71) Applicant: FACEBOOK, INC., Menlo Park, CA (US)

(72) Inventors: Andrew Hoskins, Burlingame, CA (US); Anh Tuan Khuc, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 13/801,725

(22) Filed: Mar. 13, 2013

(65) Prior Publication Data
US 2014/0274358 A1 Sep. 18, 2014

(51) Int. Cl.
*A63F 9/24* (2006.01)
*A63F 13/352* (2014.01)
*A63F 13/795* (2014.01)

(52) U.S. Cl.
CPC ........... *A63F 13/352* (2014.09); *A63F 13/795* (2014.09); *A63F 2300/5566* (2013.01)

(58) Field of Classification Search
None
See application file for complete search history.

(56) References Cited

U.S. PATENT DOCUMENTS

| | | | | |
|---|---|---|---|---|
| RE45,040 E | * | 7/2014 | Fish ........................ | A63F 13/12 463/42 |
| 2008/0242420 A1 | * | 10/2008 | Graepel .................. | A63F 13/12 463/42 |
| 2009/0075738 A1 | * | 3/2009 | Pearce .................... | G07F 17/32 463/42 |
| 2009/0098918 A1 | * | 4/2009 | Teasdale ................. | A63F 13/10 463/7 |
| 2009/0156312 A1 | * | 6/2009 | Ng et al. ......................... | 463/42 |
| 2010/0160038 A1 | | 6/2010 | Youm et al. | |
| 2011/0276639 A1 | | 11/2011 | Schrader | |
| 2012/0252418 A1 | | 10/2012 | Kandekar et al. | |
| 2012/0290109 A1 | * | 11/2012 | Engelberg et al. ............. | 700/91 |
| 2013/0151527 A1 | * | 6/2013 | Bruich et al. ................. | 707/737 |
| 2013/0165234 A1 | * | 6/2013 | Hall et al. ..................... | 463/42 |

OTHER PUBLICATIONS

Final Office Action for U.S. Appl. No. 13/835,604, mailed Sep. 11, 2015, 11 pages.
Non-Final Office Action for U.S. Appl. No. 13/835,604, mailed Jan. 15, 2015, 9 pages.

* cited by examiner

*Primary Examiner* — Jason Yen
(74) *Attorney, Agent, or Firm* — Nicholson De Vos Webster & Elliott LLP (57) ABSTRACT

Exemplary methods, apparatuses, and systems provide a suggested list of people for a user of a social network system to play a game with. A social networking system receives a trigger for providing the user access from a user device to the game over a network. The social networking system identifies a pool of people who have a personal connection with the user and who have not played the game before. From the pool of people, a suggested list of people is selected based on closeness to the user. The suggested list is sent to the user device for the user device for the user to selectively invite one or more of the people to play the game.

17 Claims, 8 Drawing Sheets

SUGGESTING FRIENDS FOR PLAYING A GAME

FIELD

The various embodiments described herein relate to social networks. In particular, the embodiments relate to integration of online gaming with a social network.

BACKGROUND

Social networking systems have become prevalent in recent years because they provide an environment in which users can connect to and communicate with other users. Social networking systems commonly provide mechanisms allowing users to interact within their social networks. In this context, a user may be an individual or any other entity, such as a business or other non-person entity. A social networking system allows users to designate other users or entities as connections (or otherwise connect to, or form relationships with, other users or entities), contribute and interact with their connections, use applications, join groups, list and confirm attendance at events, invite connections, and perform other tasks that facilitate social interaction.

One type of application that a user of a social networking system can access is an online game. A social networking system can serve as a platform for its users to play online games and share their gaming experiences.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include methods, apparatuses, and systems for providing a suggested list of people to a user of a social networking system for the user to play an online multiplayer game with. The suggested list of people is selected from a pool of people who have a personal connection with the user and who have not played the game before. The people having a personal connection with the user are the user's friends, friends of friends, close friends of friends, etc. The suggested list of people is selected based on their closeness to the user in the personal connection. The suggested list is sent to the user device for the user to selectively invite one or more of the people to play the game. In one embodiment, the suggested list shows the reason why each person is selected into the list, if such information is not blocked by that person for privacy concerns. The people in the suggested list are more likely to accept the user's invitations, and it may be more fun for the user to play with these people due to the closeness in personal connection. Thus, the social networking system provides enhanced game playing experiences for its users.

A social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 1A:
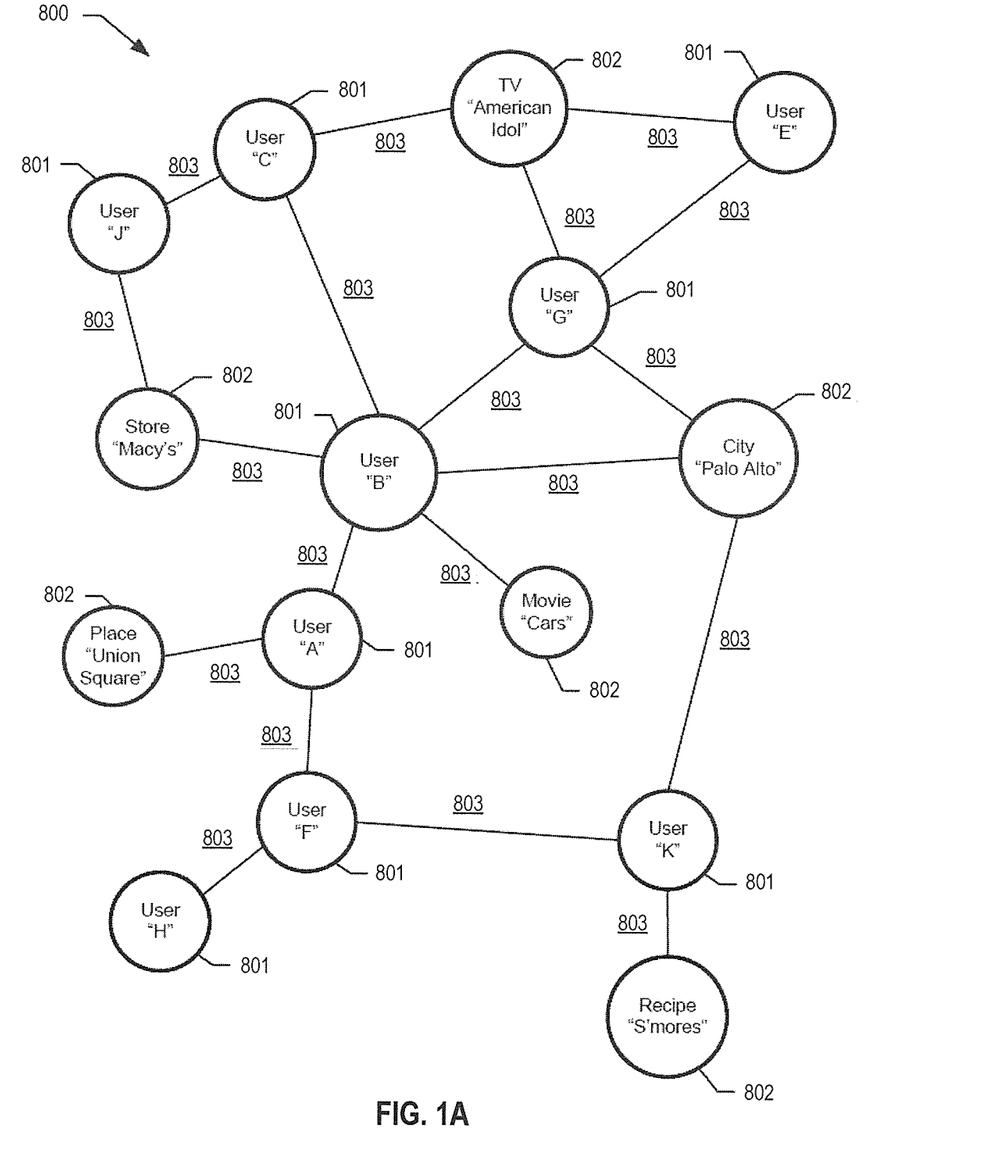
FIG. 1A illustrates an example social graph that may be used by a social networking system.

FIG. 1A illustrates an example social graph 800 that may be used by a social networking system. In the example of FIG. 1A, social graph 800 includes user nodes 801, concept nodes 802, and edges 803 between nodes. An edge 803 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and "G" watch (or "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes the store "Macy's." Of course, social graphs can be much larger than social graph 800 illustrated in FIG. 1A, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of hops required to traverse the social graph from one node to the other. Thus, for user "B", the nodes for users "A", "C", and "G" are all one hop away and are thus users of first-degree and may be described as "connected to" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "friends of friends." Accordingly, user "B" is either a "friend" or a "friend of a friend" with every other user in the graph except for user "H", as the shortest path between user "B" and user "H" transits through two user nodes.

Figure 1B:
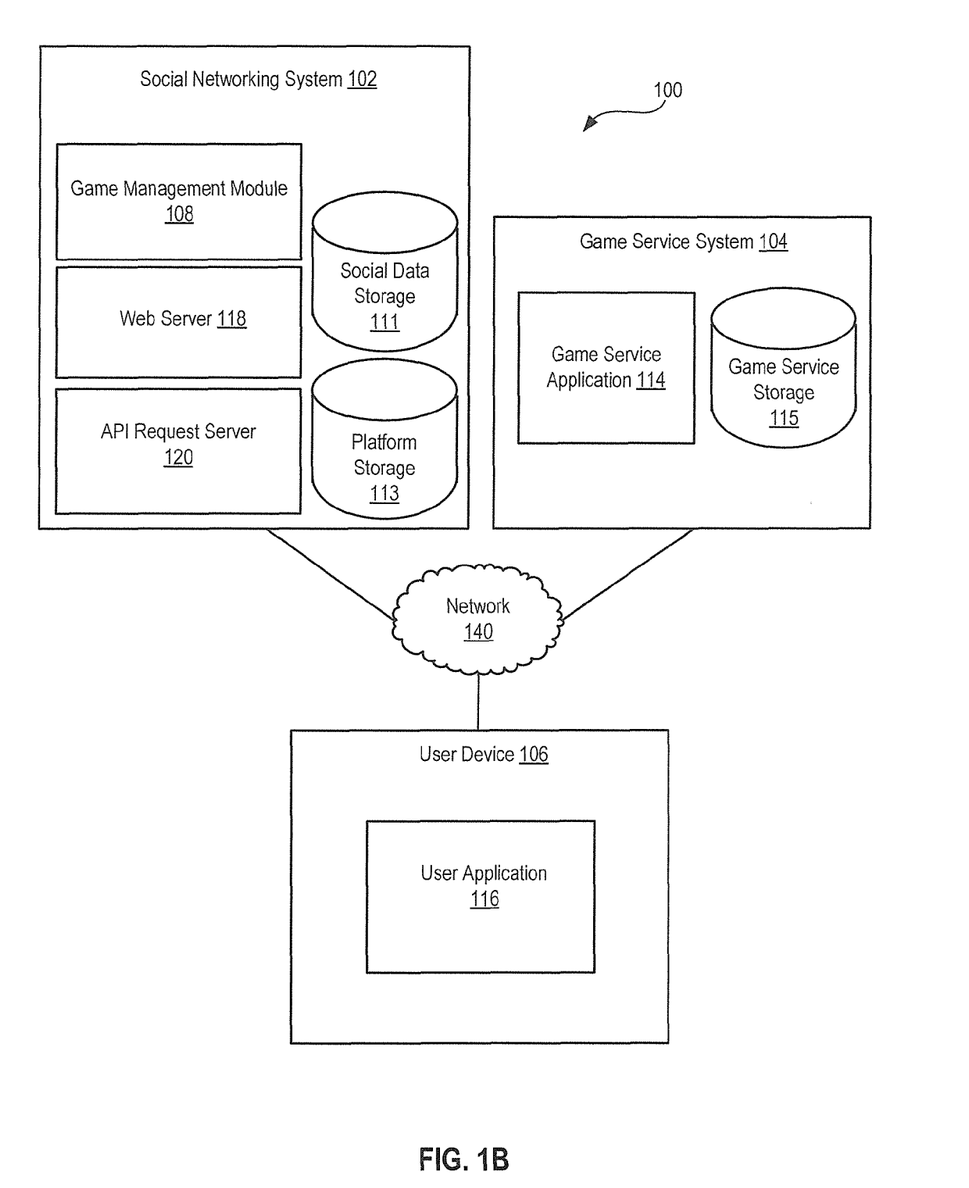
FIG. 1B illustrates a network diagram of a system for suggesting friends for playing a game according to one embodiment of the invention.

FIG. 1B illustrates a network diagram of a system 100 for providing a list of suggested friends for playing a game with a user of a social networking system, according to one embodiment of the invention. The system 100 includes one or more user devices 106, one or more game service systems 104, the social networking system 102, and a network 140. For purposes of illustration, the embodiment of the system 100 includes a single game service system 104 and a single user device 106. However, in other embodiments, the system 100 may include more user devices 106 and/or more game service systems 104.

The game service system 104 can be separate from the social networking system 102 or can be part of the social networking system 102. For example, the game service system 104 and the social networking system 102 may be operated by different entities or the same entity. The game service system 104 can also be separate from the social networking system 102 in the sense that the game service system 104 is associated with one domain while the social networking system 102 is associated with a separate social networking domain.

A user device 106 comprises one or more computing devices that can receive input from a user and can transmit and receive data via the network 140. In one embodiment, the user device 106 is a computing system such as the exemplary system in FIG. 7. The user device 106 can be a conventional computer system executing an operating system (OS) such as a Microsoft Windows compatible OS, Apple OS X, and/or a Linux distribution. In another example, the user device 106 can be a mobile device having computer functionality, such as a personal digital assistant (PDA), mobile telephone, smart-phone, or other mobile computing device. The user device 106 is configured to communicate via the network 140. The user device 106 can execute a user application 116, for example, a browser application that allows a user of the user device 106 to interact with the social networking system 102. In another embodiment, the user device 106 interacts with the social networking system 102 through an application programming interface (API) that runs on the native operating system of the user device 106, such as iOS® 4 and ANDROID®. The user device 106 is configured to communicate with the game service system 104 and the social networking system 102 via the network 140, which may comprise any combination of local area and/or wide area networks (e.g., the Internet), using wired and/or wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, digital subscriber line (DSL), etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 140 can be represented using technologies and/or formats including the hypertext markup language (HTML) and the extensible markup language (XML). In addition, all or some links can be encrypted using conventional encryption technologies such as secure sockets layer (SSL), transport layer security (TLS), and Internet Protocol security (IPsec).

The user device 106 includes the user application 116 for displaying content from the game service system 104 and/or from the social networking system 102. For example, in one embodiment, the user device 106 displays content from the game service system 104 and/or from the social networking system 102 by processing a markup language document using a browser application. A markup language document can identify content and one or more instructions describing formatting or presentation of the content. By executing the instructions included in a markup language document, the user application 116 displays the identified content using the format or presentation described by the markup language document. In one such example, the markup language document includes instructions for generating and displaying a web page having multiple frames that include text and/or image data retrieved from the game service system 104 and/or from the social networking system 102. A markup language document may include a data file including extensible markup language (XML) data, extensible hypertext markup language (XHTML) data, or other markup language data. Additionally, a markup language document may include JavaScript Object Notation (JSON) data, JSON with padding (JSONP), and JavaScript data to facilitate lightweight data interchange between the user device 106 and the game service system 104 and/or the social networking system 102. In one such example, the user application 116 includes a JavaScript compiler to decode such a markup language document.

The game service system 104 includes one or more game service applications 114 and game service storage 115. The game service system 104 provides access to one or more multiplayer games via the one or more game service applications 114 over the network 140. The multiplayer games can be role-based games, first-person shooter games, turn-based games, real-time games, synchronous action games, asynchronous action games or any other games that involve multiple players in a game session. The game service system 104 can provide web page content, which the user device 106 accesses via the network 140 with the user application 116. While illustrated as being external to the social networking system, the game service system 104 may be a part of the social networking system in some embodiments.

The social networking system 102 includes a web server 118, an application programming interface (API) request server 120, social data storage 111 and platform storage 113. Social data storage 111 stores social graphs such as the social graph 800 of FIG. 1A. Platform storage 113 stores user preferences/settings, profile data, and other information for operation of the social networking system 102. The social networking system 102 includes platform applications. Examples of platform applications include applications for social interactions (e.g., publishing posts, pictures, etc.) as well as social games, messaging services, and any other application that uses the social platform provided by the social networking system 102. The web server 118 links the social networking system 102 to the user device 106 and/or the game service system 104 via the network 140. The web server 118 serves web pages, as well as other web-related content, such as Java, Flash, XML, and so forth. The web server 118 may include a mail server or other messaging functionality for receiving and routing messages between the social networking system 102 and the user device 106. The messages can be instant messages, queued messages (e.g., email), text and SMS messages, or any other suitable messaging format. The platform applications may have the ability to suggest friends.

The Application Programming Interface (API) request server 120 allows one or more game service systems 104 and user devices 106 to access information from the social networking system 102 by calling one or more APIs. The API request server 120 may also allow the user device 106 to send requests or information to the social networking website by calling APIs. The user device 106, in one embodiment, sends an API request to the social networking system 102 via the network 140 and the API request server 120 receives the API request. The API request server 120 processes the request by calling an API associated with the API request to generate an appropriate response, which the API request server 120 communicates to the user device 106 via the network 140. In one embodiment, the one or more game service systems 104 communicate with the social networking system 102 via APIs in the same manner as the user device 106.

Users of the social networking system 102 can add connections to a number of other users of the social networking system 102 to whom they desire to be connected. As used herein, the term "friend" refers to any other user of the social networking system 102 to whom a user has formed a connection, association, or relationship via the social networking system 102. Connections may be added explicitly by a user or may be automatically created by the social networking system 102 (e.g., based on common characteristics of the users). For example, a first user specifically selects a particular other user to be a friend. Connections between users of the social networking system 102 are usually bilateral, or "mutual," but connections may also be unilateral, or "one-way." For example, if Bob and Joe are both users of the social networking system 102 and connected to each other, Bob and Joe are each other's friends. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

The social networking system 102 provides users with the ability to interact with each other through online games. A game management module 108 of the social networking system 102 manages information of the games that can be accessed and played via the social networking system 102. For example, a user may log into the social networking system 102 to play a game that is run on the social networking system 102 or on one of the game service systems 104. The information managed by the game management module 108 may be collected by the social networking system 102 and/or the game service systems 104. Examples of the information include both the players' information (such as the players' names, the players' demographics and locations, the skill rating of each player, the people with whom each player has played in the past, the number of times each player has completed a game, each player's pace of game playing, etc.), and the social data of the user (such as the user's friends, friends of friends, user profile, user online social activities, etc.).

Figure 2:
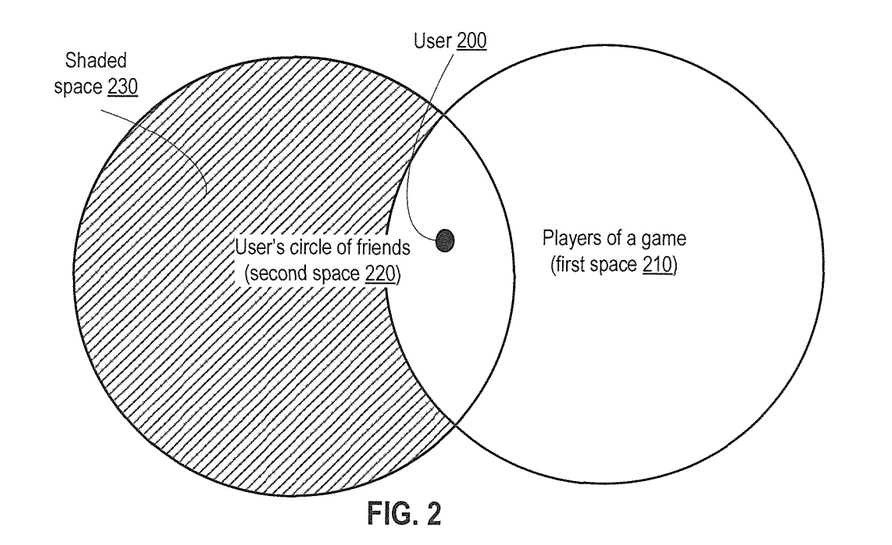
FIG. 2 is a diagram illustrating a space within which friends for playing a game can be identified, according to one embodiment of the invention.

FIG. 2 illustrates a diagram of people that a user 200 of the social networking system 102 may be suggested to play a game with, according to one embodiment of the invention. The user 200 is represented by the solid black dot in the center of the diagram. The players of the game are represented by a first space 210 (the right circle), which includes the user 200. The user's circle of friend is represented by a second space 220 (the left circle). The user's circle of friends is a pool of people that each has a personal connection with the user, such as the user's friends. In some embodiments, the definition of the user's circle of friends can be expanded by the social network system 102 and/or by the user 200 to include not only those people having a direct personal connection with the user (such as the user's friends), but also include those people having an indirect personal connection with the user (such as friends of friends, close friends of friends, etc.). In a social graph such as the social graph 800 of FIG. 1A, the people having a personal connection with the user include those people who are connected to the user node of the user directly (i.e., friends of the user), and may additionally include those people who are connected to the user indirectly through another user node (i.e., friends/close friends of friends). The term "personal" connection is used herein to indicate that the connection between the user and the person is either a direct connection or an indirect connection that goes through another person (instead of going through a concept node).

In one embodiment, the game management module 108 of the social networking system 102 selects a list of people from the shaded space 230, which is within the second space 220 but outside the first space 210. The shaded space 230 represents the people who have a personal connection with the user 200 but have not played the game. The game management module 108 filters the people represented in the shaded space 230, and selects a list of people that user may like to invite and are likely to accept the invitation from the user for playing the game. The game management module 108 then presents the identified list to the user 200 for user selection.

In one embodiment, the list of people presented to the user is selected based on their closeness to the user in personal connection. The closer a user is to a person, the more likely that the user will invite that person and that person will accept the user's invitation. The closeness may be indicated in or determined from profile information, social interaction, and/or past online activities. For example, a person's closeness to the user may be indicated in the profile information of the user and the person, where the profile information indicates whether the person and the user live in or comes from the same city, were graduated from the same school, are in the same age group, has the same gender, speak the same language, have the same demographics, have the same "taste" (e.g., like similar kinds of games, music, books, food, shows, etc.), have a large number of mutual friends, and/or other background, status, social and preference information. This information may be indicated in that person's account setting, profile and preference settings.

Moreover, a person's closeness to the user may also be determined or gathered from social interaction between the user and the person. The social interaction indicates whether the person frequently exchanges messages with the user, frequently comments on or likes the user's posting, frequently participates in the same events as the user, has played other games with the user, has invited the user to play other games, and/or other social interaction between the user and the person. The social interaction between a user and a person may be gathered from the user's history of messaging, posting, comments to posting, likes, uploaded images/videos, and participated events and activities. The social interaction may take into account the frequency and recentness of the interaction between the user and the person.

Additionally, a person's closeness to the user may also be determined or gathered from the person's and/or the user's past online activities, such as whether the person frequently plays similar games to the one that the user is planning to play, is similarly engaged in game plays as the user (e.g., has similar reputation with respect to the number of quits before game completion), plays games at a similar pace as the user, has received and accepted invitations for any game from anyone before (e.g., percentage of invitation acceptance, which may be an indication of how likely this person will accept an invitation for game play), has received invitations for any game from the user before (which may be an indication of how likely the user will send an invitation to this person), has sent any invitation to the user (which may be an indication of how likely this person will accept an invitation from the user), and/or other past online activities. The past online activities may be gathered from logged activities in the social networking system. The past online activities may take into account the frequency and the recentness of these activities.

Figure 3:
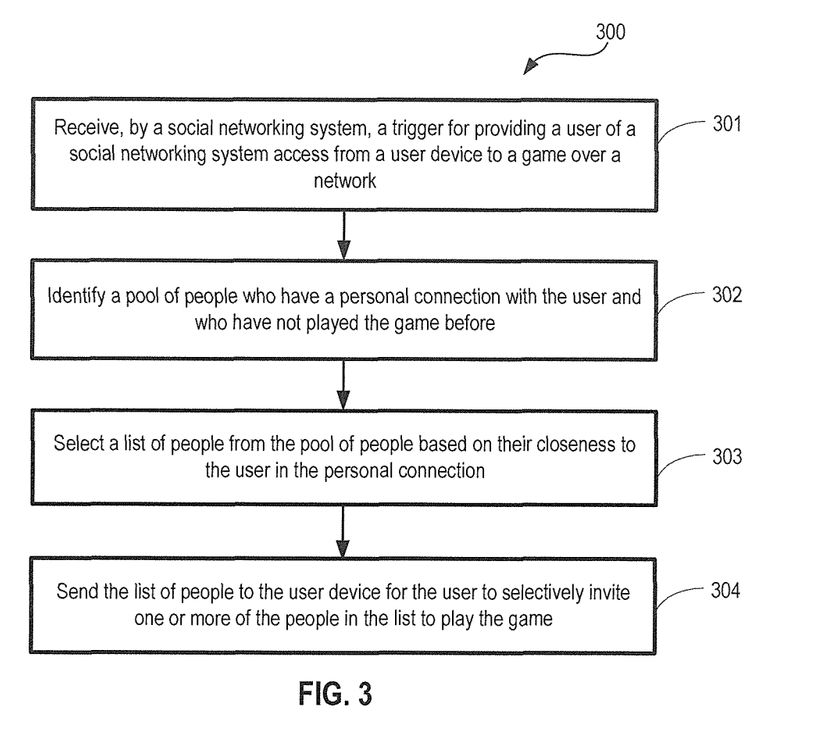
FIG. 3 illustrates a flow diagram for a method of providing a suggested list of people for playing a game, according to one embodiment of the invention.

FIG. 3 is a flow diagram illustrating a method 300 for suggesting friends for playing a game according to one embodiment of the invention. The method 300 can be executed by one or more processing devices (e.g., the computing system 700 of FIG. 7); for example, the processing devices that execute the operations of the social networking system 102 of FIG. 1.

At block 301, a social networking system receives a trigger for providing a user access to a game over the network from a user device. The network may be the network 140 of FIG. 1B. The trigger may occur at least in part by the user selecting an identifier of the game (e.g., an icon, a name, a link or another indicator) on the user device. The identifier of the game may be accessible from the user's home page or other pages in the social networking system, or may be located by the user when entering the game title into a search tool provided by the social networking system. The trigger may also occur when the user logs into his/her social networking account and/or when a promotional campaign for the game begins. At block 302, the social networking system identifies a pool of people who have a personal connection with the user and who have not played the game before. At block 303, the social networking system selects a list of people from the pool of people based on their closeness to the user in the personal connection. This list is also referred to as a "suggested list of people" or "suggested list of friends." The closeness is determined based on the social data of the user and the social data of each person in the pool. Examples of the social data source include but are not limited to: information provided by the user to the social networking system, information provided by game service systems hosting online game to the social networking system, and information provided by other users of the social networking system. At block 304, the social networking system sends the list of people to the user device for the user to selectively invite one or more of the people in the list to play the game. After the user makes a selection, the social networking system or user then sends an invitation to the one or more of selected people to play the game with the user over the network. In some embodiments, when the necessary number of players for the game accepts the invitation, a new game session can be started.

Figure 4A:
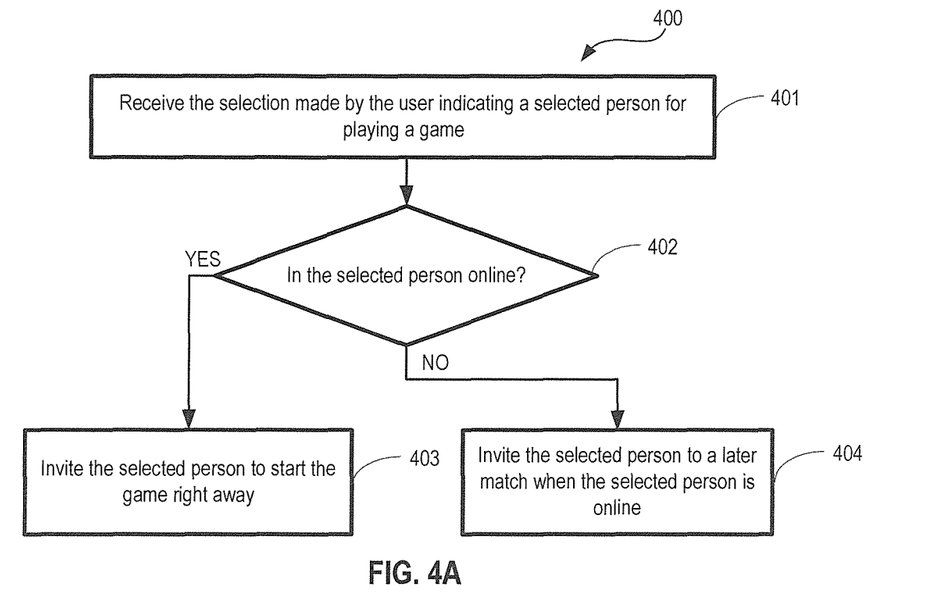
FIG. 4A illustrates a flow diagram for a method of sending an invitation to a person selected by a user, according to one embodiment of the invention.

FIG. 4A is a flow diagram illustrating a method 400 for inviting a selected person for playing a game according to one embodiment of the invention. The method 400 can be executed by one or more processing devices (e.g., the computing system 700 of FIG. 7); for example, the processing devices that execute the operations of the social networking system 102 of FIG. 1. The method 400 is performed after the user has selected one or more people from the list of people suggested by the social networking system. For simplicity, only one selected person is described herein. It is understood that the method 400 applies to any number of people selected by the user.

In one embodiment, at block 401, the social networking system receives the selection made by the user indicating a selected person for playing a game. The social networking system determines at block 402 whether the selected person is online before sending an invitation. If the selected person is online, an invitation is sent to that person to start the game right away at block 403. If the selected person is not online, an invitation to a future game is sent to that person at block 404. It is contemplated that co-players of some asynchronous games do not have to be online at the same time. For example, in a turn-based game that is not under time control (e.g., a chess game without a timer), two players may be online at different times while playing against each other.

Figure 4B:
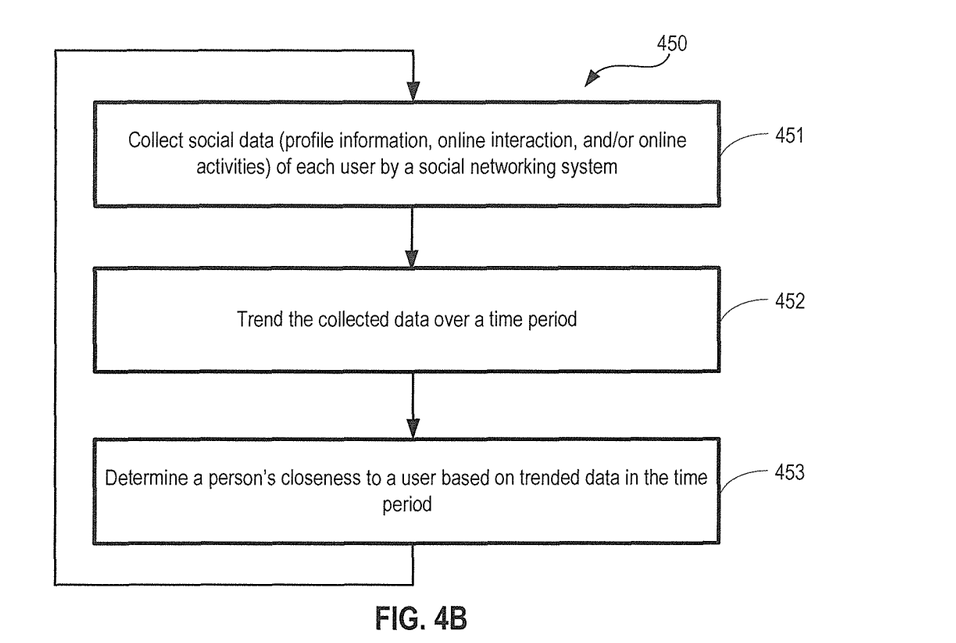
FIG. 4B illustrates a flow diagram for a method of trending collected social data according to one embodiment of the invention.

FIG. 4B is a flow diagram illustrating a method 450 for collecting and trending social data according to one embodiment of the invention. The method 450 can be executed by one or more processing devices (e.g., the computing system 700 of FIG. 7); for example, the processing devices that execute the operations of the social networking system 102 of FIG. 1.

At block 451, the social networking system collects social data of each user of the social networking system. The collected data includes the user profile information, the user's social interaction with other users, and other online activities of the user. At block 452, the social networking system trends the collected data over a time period. Older data (e.g., data collected over a week or month ago) is discarded such that only recent data is use for trending social interaction and online activities. At block 453, the social networking system determines a person's closeness to the user based on trended data in the time period. Blocks 451-453 are repeated during the operation of the social networking system.

Figure 5:
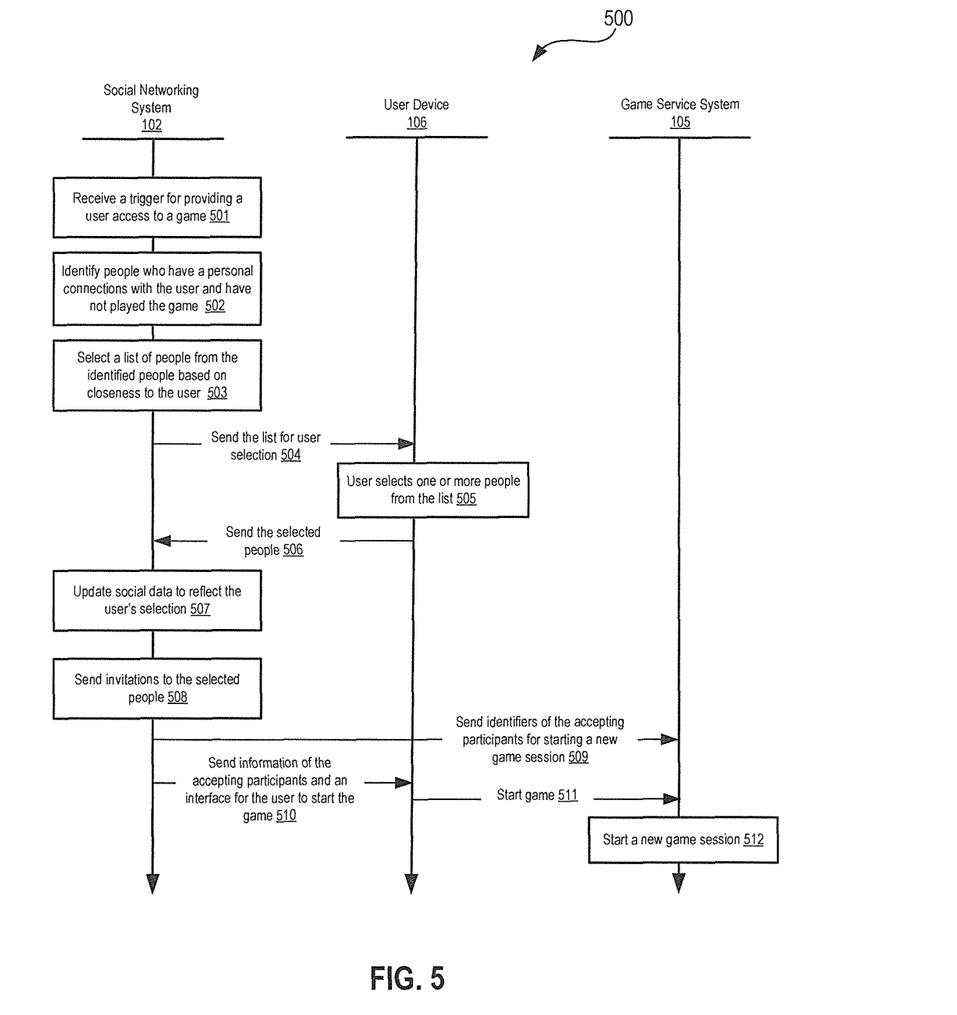
FIG. 5 illustrates a message exchange diagram amongst a social networking system, a user device, and a game service system, according to one embodiment of the invention.

FIG. 5 illustrates a message exchange diagram 500 amongst the social networking system 102, the user device 106, and the game service system 104 according to one embodiment of the invention. The message exchange diagram 500 provides one exemplary embodiment of the method 300 described with reference to FIG. 3. The message exchange enables a social networking system to provide a suggested list friends to a user for playing a game.

The message exchange of diagram 500 begins with the social networking system 102 receiving a trigger for providing access to a game to the user (501). The trigger may occur in response to one or more of the events described above with respect to block 301 of FIG. 3. Upon receiving the trigger, the social networking system 102 identifies a pool of people who have a personal connection with the user and who have not played the game before (502). The social networking system 102 then selects a list of people from the pool based on their closeness to the user (503).

The social networking system 102 then sends the list to the user device 106 for user selection (504). For each person in the list, the social networking system 102 may also send an indication of the reason why that person is selected, if such information is not blocked for privacy concerns. The user selects one or more people from the list (505), and sends the identifiers of the selected people to the social networking system 102 (506). The social networking system 102 then updates the social data to reflect the user's selection (507), and sends an invitation to the selected one or more people (508). The social networking system 102 then sends the identifiers of the people who accept the invitation to the game service system 104 for starting a new game session (509). The social networking system 102 also sends the information (e.g., name, profile photo, etc., if such information is not blocked for privacy concerns) of the one or more accepting participants to the user device 106, as well as an interface for accessing the game service system 104 to start the game (510). In one embodiment, the social networking system 302 sends HTML content for rendering by a browser application on the user device 106. The user may start the game by sending a request to the game service system 104 via the interface (511). Alternatively, the game may start automatically without the user sending a request. The game service system 104 then starts a new game session for the user and the one or more accepting participants to play the game (512).

Figure 6A:
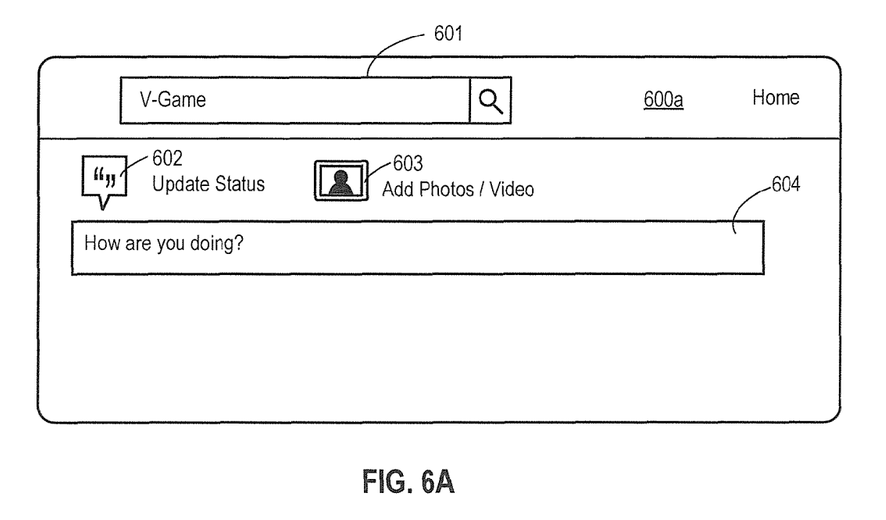
FIGS. 6A-C illustrate exemplary GUI windows on a user device enabling a user to select a person to play a game with, according to embodiments of the invention.
Figure 6B:
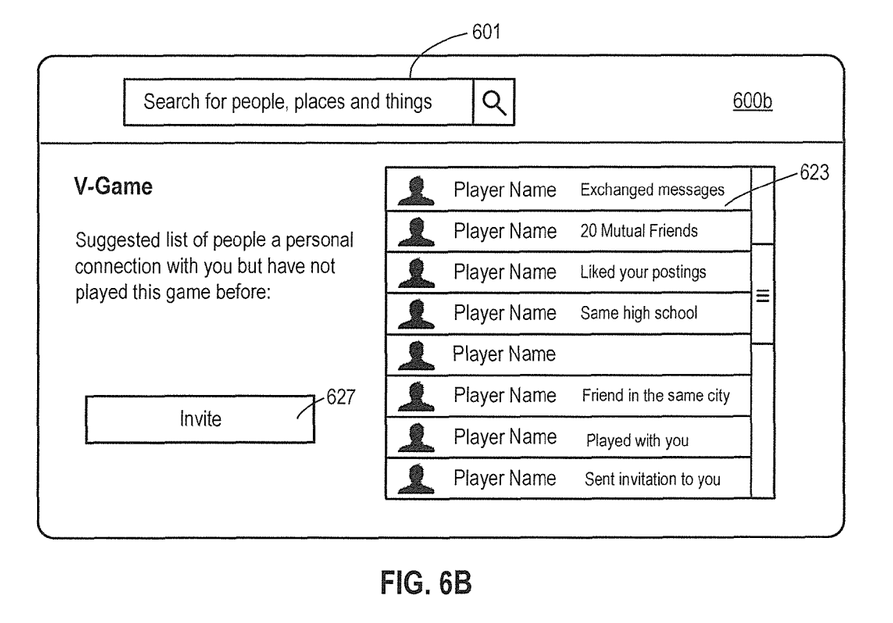
Figure 6C:
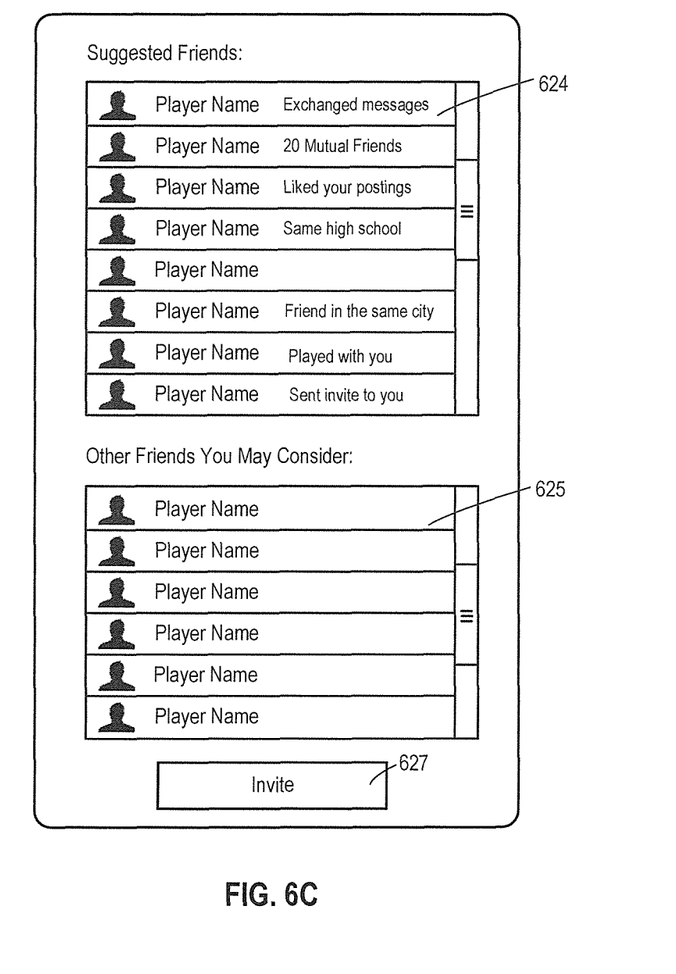

FIGS. 6A-6C illustrate exemplary GUI windows on a user device according to embodiments of the invention. FIG. 6A illustrates an example of a GUI window 600a of a user's home page hosted by a social networking system (e.g., the social networking system 102 of FIG. 1). For example, the GUI window 600a can be rendered from HTML content sent by the social networking system to a user device (e.g., the user device 106 of FIG. 1). The icons 602 and 603 indicate different actions that a user can take, for example, "Update Status" (which posts the message that the user writes into the space 604) and "Add Photos/Video" (which posts the user's photos or video uploaded into the social networking system). Other, more, or fewer user actions are also possible. For example, another option may be "Play Games," which is linked to a list of games that the user has played in the past or may be interested in playing. The user may select one of the games from the list to request starting the game.

The GUI window 600a also provides a search tool 601, which enables the user to search for people, places and things within the social networking system and the World Wide Web. When a user enters the title of a game that he/she wishes to play, the search tool 601 will locate a link to the game service system hosting the game (e.g., the game service system 104 of FIG. 1B). The link may be displayed on the GUI as an icon or an identifier identifying the game. When the user selects the link, another GUI window 600b is displayed that enables the user to select a person to play the game with. Although the selection of one person is described below, it is understood that the following description applies to the selection of any number of people.

FIG. 6B illustrates the GUI window 600b displayed after the user has selected a game to play. The GUI window 600b displays the game title ("V-Game"). Based on the closeness of the user, the social networking system identifies a list 623 of people for the user to select (e.g., according to the method 300 described above with reference to FIG. 3). The list 623 may be alphabetically-ordered, ordered by the closeness to the user, or by other means. The list 623 may show the reason why a person is chosen into the list, if displaying such information does not violate that person's privacy settings. If a person is chosen into the list 623 for multiple reasons, the reason that is most heavily weighted is shown. The user may select any person from the list 623 and activate an "Invite" button 627 to cause an invitation to be sent to the selected person.

FIG. 6C illustrates an alternative GUI window 600c displayed after the user has selected a game to play. The GUI window 600c includes two sections: a first section 624 (which is the same as the list 623 of FIG. 6B) showing the suggested list of people that the user can play a game with, and a second section 625 showing other people that the user may consider to play with. The people in the second section 625 are the ones that are in the pool of people (represented by the shaded space 230 of FIG. 2) but are not selected into the list 623 due to lack of closeness to the user in the personal connection. The user may select any person from the sections 624 and 625, and activate the "Invite" button 627 to cause an invitation to be sent to the selected person.

In one embodiment, the social networking system can implement a machine learning mechanism that automatically learns from the user's selection. For example, the social networking system can learn how often a particular person is selected by the user and adjust the weight assigned to the person based on the selection frequency. The social networking system can also learn which reason (also referred to as a "social attribute" or "attribute") contributes the most to the closeness between the user and the selected person. The social networking system can adjust the weights or ranking of the attributes based on the machine learning. For example, if the user consistently or frequently selects a person who lives in the same city, the attribute "same city" can be given a higher weight than other attributes. If the user never or seldom selects people who speak the same language, the attribute "same language" can be given a lower weight than other attributes. In an embodiment, the weights of the social attributes can be changed by the user from a GUI window provided by the social networking system. A change in the weights of the social attributes may cause a different list of people to be selected by the social networking system as the suggested list of friends.

Figure 7:
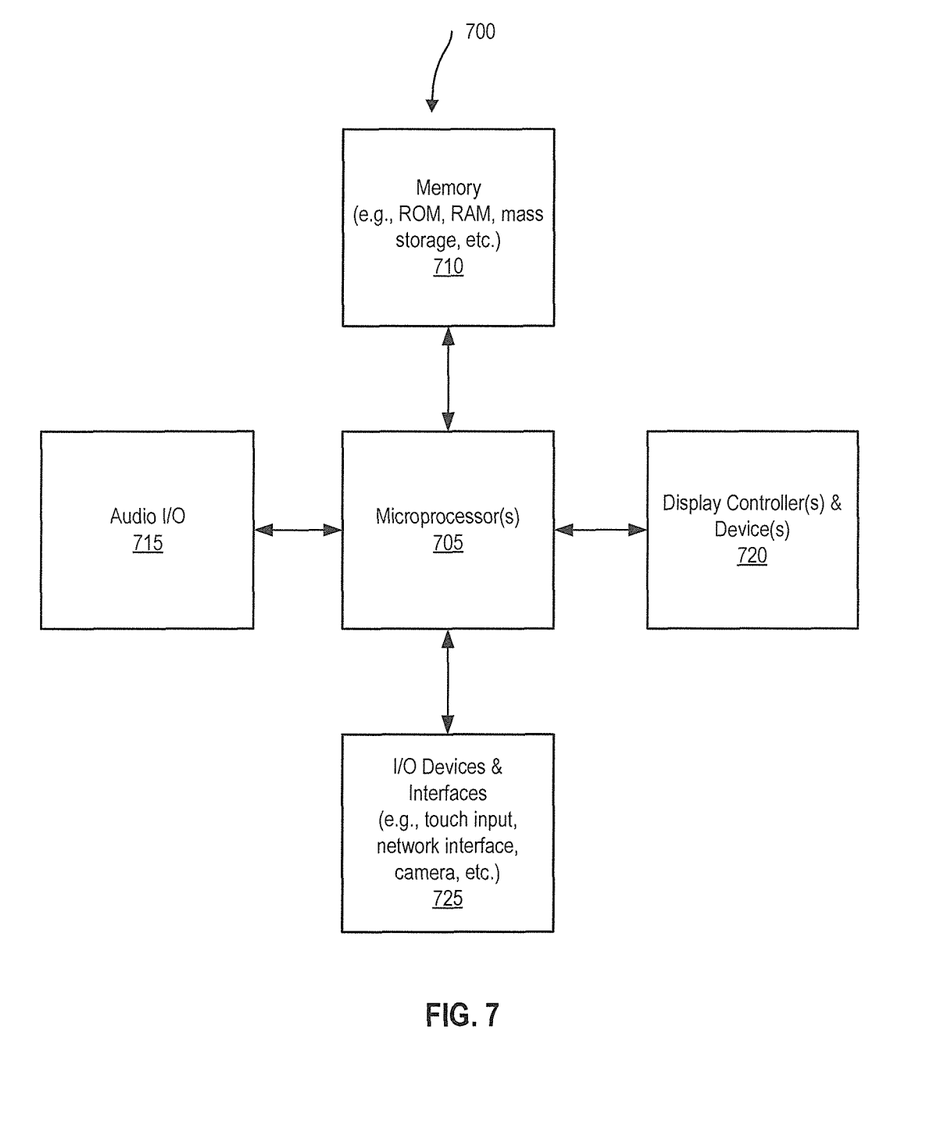
FIG. 7 illustrates a computing system in which embodiments may operate, be installed, integrated, or configured.

FIG. 7 illustrates, in block diagram form, an exemplary computing system 700 in accordance with which embodiments may operate, be installed, integrated, or configured. The computing system 700 includes one or more microprocessors 705 and connected system components (e.g., multiple connected chips). Alternatively, the computing system 700 is a system on a chip.

The computing system 700 includes memory 710, which is coupled to the microprocessor(s) 705. The memory 710 may be used for storing data, metadata, and programs for execution by the microprocessor(s) 705. The memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 710 may be internal or distributed memory.

The computing system 700 also includes an audio input/output subsystem 715 which may include a microphone and/or a speaker for, for example, playing back music or other audio, receiving voice instructions to be executed by the microprocessor(s) 705, playing audio notifications, etc.

A display controller and display device 720 provides a visual user interface for the user. In an embodiment where the computing system 700 is an exemplary representation of the user device 106 of FIG. 1B, the display device 720 may display the GUI windows illustrated in FIGS. 6A-6C.

The computing system 700 also includes one or more input or output ("I/O") devices and interfaces 725, which are provided to allow a user to provide input to, receive output from, and otherwise transfer data to and from the system. These I/O devices 725 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the computing system 700.

The I/O devices and interfaces 725 may also include a connector for a dock or a connector for a USB interface, Fire Wire, Thunderbolt, Ethernet, etc. to connect the computing system 700 with another device, external component, or a network. Exemplary I/O devices and interfaces 725 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the computing system 700 with another device, external component, or a network and receive stored instructions, data, tokens, etc.

It will be appreciated that one or more buses, may be used to interconnect the various components shown in FIG. 7.

In one embodiment, the computing system 700 is an exemplary representation of the user device 106 of FIG. 1B. The computing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In another embodiment, the computing system 700 is an exemplary representation of a server computer in the social networking system 102 of FIG. 1B. In other embodiments, the computing system 700 may be a network computer, server, or an embedded processing device within another device or consumer electronic product. As used herein, the terms computer, system, device, processing device, and "apparatus comprising a processing device" may be used interchangeably with the computing system 700 and include the above-listed exemplary embodiments.

It will be appreciated that additional components, not shown, may also be part of the computing system 700, and, in certain embodiments, fewer components than that shown in FIG. 7 may also be used in a computing system 700. It will be apparent from this description that aspects of the inventions may be embodied, at least in part, in software. That is, computer-implemented methods may be carried out in a computer system or other data processing system in response to its processor or processing system executing sequences of instructions contained in a memory, such as memory 710 or other non-transitory machine-readable storage medium. The software may further be transmitted or received over a network (not shown) via a network interface device 725. In various embodiments, hardwired circuitry may be used in combination with the software instructions to implement the present embodiments. Thus, the techniques are not limited to any specific combination of hardware circuitry and software, or to any particular source for the instructions executed by the computing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:
   receiving, by a communication system, a trigger for providing a user of the communication system access from a user device to a game over a network;
   identifying, by the communication system, a pool of people who have a personal connection with the user within the communication system and who have not previously played the game;
   determining, by the communication system, for each person in the pool of people, a closeness to the user based on one or more weighted social attributes, the social attributes determined from user profile information of each person in the pool of people stored by the communication system and communication system interactions between the user and each person in the pool, wherein the weighted social attributes are weighted based upon social attributes of people previously invited by the user to play a game over the network;
   selecting, by the communication system, a list of one or more people from the pool of people based on the determined closeness of persons in the pool of people to the user; and
   sending, by the communication system, the selected list of one or more people to the user device, wherein sending the selected list causes the user device to display each of the one or more people as selectable display objects, wherein user selection of a person represented by one of the selectable display objects enables the user to initiate an invitation to the selected person via the communication system, and wherein sending the selected list of people further causes the user device to display, for each of one or more persons in the list, a reason why the person in the list is selected, the reason based upon the determined closeness of the person to the user.

2. The method of claim 1, wherein the pool of people who have a personal connection with the user include friends of the user.

3. The method of claim 1, wherein closeness to the user is further determined based upon from at least one of profile information of the user, and online activities of the user and the list of people.

4. The method of claim 3, wherein the closeness to the user is further determined based upon a frequency and recentness of the social interaction between the user and each of the one or more persons in the list of people.

5. The method of claim 1, wherein closeness to the user is determined from a person's past online activities that indicate whether the person is likely to accept an invitation to play the game from the user.

6. The method of claim 1, wherein closeness to the user is determined from the user's past online activities that indicate whether the user is likely to send an invitation to play the game to a person in the list.

7. The method of claim 1, wherein closeness to the user is determined from past online activities of the user and the list of people with respect to game playing.

8. The method of claim 1, wherein closeness to the user is determined from social interaction between the user and each person in the list, the social interaction including at least one of: message exchanges, posting, comments on posting, likes and uploads.

9. The method of claim 1, further comprising:
   trending data collected by the communication system over a time period; and
   determining the closeness to the user based on trended data in the time period.

10. A non-transitory computer-readable storage medium storing instructions, which when executed by a processing device, cause the processing device to perform a method comprising:
    receiving, by a communication system, a trigger for providing a user of the communication system access from a user device to a game over a network;
    identifying, by the communication system, a pool of people who have a personal connection with the user within the communication system and who have not previously played the game;
    determining, by the communication system, for each person in the pool of people, a closeness to the user based on one or more weighted social attributes, the social attributes determined from user profile information of each person in the pool of people stored by the communication system and communication system interactions between the user and each person in the pool, wherein the weighted social attributes are weighted based upon social attributes of people previously invited by the user to play a game over the network;

selecting, by the communication system, a list of one or more people from the pool of people based on the determined closeness of persons in the pool of people to the user; and sending, by the communication system, the selected list of one or more people to the user device, wherein sending the selected list causes the user device to display the selected list of one or more people as selectable display objects, wherein user selection of a person represented by one of the selectable display objects enables the user to initiate an invitation to the selected person via the communication system, and wherein sending the selected list of people further causes the user device to display, for each of one or more persons in the list, a reason why the person in the list is selected, the reason based upon the determined closeness of the person to the user.

11. The non-transitory computer-readable storage medium of claim 10, wherein the pool of people who have a personal connection with the user include friends of the user.

12. The non-transitory computer-readable storage medium of claim 10, wherein closeness to the user is further determined based upon from at least one of profile information of the user, and online activities of the user and the list of people.

13. The non-transitory computer-readable storage medium of claim 10, wherein the method further comprises:
trending data collected by the communication system over a time period; and
determining the closeness to the user based on trended data in the time period.

14. The non-transitory computer-readable storage medium of claim 10, wherein closeness to the user is determined from social interaction between the user and each person in the list, the social interaction including at least one of: message exchanges, posting, comments on posting, likes and uploads.

15. A communication system comprising:
a processing device; and
a memory coupled to the processing device, the memory storing instructions which, when executed by the processing device, cause the communication system to:
receive a trigger for providing a user of a communication system access from a user device to a game over a network;
identify a pool of people who have a personal connection with the user within the communication system and who have not previously played the game;
determine for each person in the pool of people, a closeness to the user based on one or more weighted social attributes, the social attributes determined from user profile information of each person in the pool of people stored by the communication system and communication system interactions between the user and each person in the pool, wherein the weighted social attributes are weighted based upon social attributes of people previously invited by the user to play a game over the network;
select a list of one or more people from the pool of people based on the determined closeness of persons in the pool of people to the user; and
send the selected list of one or more people to the user device, wherein sending the selected list causes the user device to display the selected list of one or more people as selectable display objects, wherein user selection of a person represented by one of the selectable display objects enables the user to initiate an invitation to the selected person via the communication system, and wherein sending the selected list of people further causes the user device to display, for each of one or more persons in the list, a reason why the person in the list is selected, the reason based upon the determined closeness of the person to the user.

16. The communication system of claim 15, wherein the execution of the instructions further causes the communication system to:
trend data collected by the communication system over a time period; and
determine the closeness to the user based on trended data in the time period.

17. The communication system of claim 15, wherein closeness to the user is determined from social interaction between the user and each person in the list, the social interaction including at least one of: message exchanges, posting, comments on posting, likes and uploads.

* * * * *